US007072352B2

(12) United States Patent
Lebizay et al.

(10) Patent No.: US 7,072,352 B2
(45) Date of Patent: Jul. 4, 2006

(54) INVERSE MULTIPLEXING OF UNMANAGED TRAFFIC FLOWS OVER A MULTI-STAR NETWORK

(75) Inventors: Gerald Lebizay, Madison, NJ (US); David W Gish, Riverdale, NJ (US); Henry M Mitchel, Wayne, NJ (US)

(73) Assignee: Intel Corporation, Santa Clara, CA (US)

( * ) Notice: Subject to any disclaimer, the term of this patent is extended or adjusted under 35 U.S.C. 154(b) by 963 days.

(21) Appl. No.: 10/080,093

(22) Filed: Feb. 21, 2002

(65) Prior Publication Data

US 2003/0156538 A1 Aug. 21, 2003

(51) Int. Cl.
*H04L 12/56* (2006.01)
*H04L 12/28* (2006.01)

(52) U.S. Cl. .................. 370/425; 370/394; 370/429
(58) Field of Classification Search ............... None
See application file for complete search history.

(56) References Cited

U.S. PATENT DOCUMENTS

| 5,555,265 | A * | 9/1996 | Kakuma et al. ....... 370/395.43 |
|---|---|---|---|
| 6,445,706 | B1 * | 9/2002 | Fransson et al. ....... 370/395.42 |
| 6,741,552 | B1 * | 5/2004 | McCrosky et al. ......... 370/218 |
| 6,754,210 | B1 * | 6/2004 | Ofek .......................... 370/389 |
| 6,778,548 | B1 * | 8/2004 | Burton et al. ............... 370/429 |
| 6,889,010 | B1 * | 5/2005 | Trezza ....................... 398/130 |
| 6,967,926 | B1 * | 11/2005 | Williams et al. ........... 370/236 |
| 2002/0089931 | A1 * | 7/2002 | Takada et al. .............. 370/232 |
| 2002/0122424 | A1 * | 9/2002 | Kawarai et al. ............ 370/394 |
| 2003/0174700 | A1 * | 9/2003 | Ofek et al. ................. 370/389 |

* cited by examiner

*Primary Examiner*—Steven Nguyen
*Assistant Examiner*—Clemence Han
(74) *Attorney, Agent, or Firm*—Pillsbury Winthrop Shaw Pittman LLP

(57) ABSTRACT

A method for inverse multiplexing of unmanaged traffic flows over a multi-star switch network, where the ingress process for each switch handles managed traffic for its switch first, then pulls a single unmanaged traffic packet off of the unmanaged traffic queue, and processes and transmits the packet. At the destination node unmanaged traffic packets received from the fabric output are acted upon by the Sequence-Checking Process to determine if the packet is in sequence. If the received packet is in sequence, the Sequence-Checking Process sends it on to the output queue. If the received packet is not in sequence, the packet is placed in a buffer. The Sequence Checking Process then checks the fabric output and the buffer by scanning for the next in-sequence packet.

27 Claims, 8 Drawing Sheets

Managed Queuing Point Terminology

INVERSE MULTIPLEXING OF UNMANAGED TRAFFIC FLOWS OVER A MULTI-STAR NETWORK

BACKGROUND OF THE INVENTION

1. Field of the Invention

The present invention generally relates to computing systems, and specifically to systems that use packet-switching fabrics, such as the InfiniBand architecture.

2. Discussion of the Related Art

In current-generation computers, the central processing unit (CPU) is connected to the system memory and to peripheral devices by a shared parallel bus, such as the Peripheral Component Interface (PCI) bus or the Industry Standard Architecture (ISA) bus. Essentially, a bus is the channel or path between components in a computer. Likewise, current server to server connections and links to other server-related systems, such as remote storage and networking devices, depend on parallel bus technology. Server design dependent on a shared bus input/output (I/O) architecture may deliver for example 512 MB/sec of potential bandwidth that is shared among devices connected to the bus. As additional connections are added to the server, potential performance-per-connection decreases and I/O contentions escalate.

As data path-widths grow, and clock speeds become faster, the shared parallel bus becomes too costly and complex to keep up with system demands. In response, the computer industry is working to develop a next-generation bus standard. Many of the proposed new standards have something in common. They propose doing away with the shared-bus technology used in PCI and moving to a point-to-point switching connection. Thus, the computer industry is moving towards fast, packetized, serial input/output bus architectures, in which computing hosts and peripherals are linked by a switching network, commonly referred to as a switching fabric. A number of architectures of this type have been proposed, and the first next-generation standard is already in place. InfiniBand has been advanced by a consortium headed by a group of industry leaders.

The InfiniBand architecture is an I/O infrastructure technology that simplifies and speeds server-to-server connections and links to other server related systems, such as remote storage and network devices. The Infiniband fabric is the central network of connections between servers and remote networking and storage devices within a data center. Infiniband architecture also constructs highly available data centers through multiple levels of redundancy. By connecting nodes via multiple links, Infiniband systems continue to perform even if one link fails. For increased reliability, multiple switches in a fabric provide redundant paths that allow for seamless re-routing of data through the fabric should a link between switches fail. Completely redundant fabrics may be configured for the highest level of reliability and may continue to perform even if an entire fabric fails.

A common problem for any network is how to provide Quality of Service (QoS) through a network. To provide QoS, the network traffic must be differentiated. Some traffic should be handled in one way, other traffic another.

For example, an entity may set up a Service Level Agreement (SLA) with a network service provider (the entity that is providing the network), that specifies that the entity's traffic will always have available a certain bandwidth (e.g., 10 Megabits per second, or 10 Mbps) and latency (e.g., less than 1 millisecond, or ms). Then, whenever a packet is detected that comes from or is going to that entity, the packet should receive special handling. If the overall flow to the entity is currently less than 10 Mbps, then the packet should get through without being dropped and with a latency of less than 1 ms. This type of flow is said to be handled by Assured Forwarding (AF). Packets arriving when the current flows are greater than 10 Mbps will be handled differently, perhaps as Best Effort (BE) traffic (see below).

As another example, a router could be set up to recognize certain types of flows as real-time flows. Real-time flows are characterized by the idea that if the packet doesn't arrive in time it might as well not arrive at all. For example, a packet of voice data in a telephone conversation has to be available at the receiver when it is needed, or it is useless. Too late, and it cannot be used and will just be discarded. So real-time traffic (a stream of packets) belonging to a voice conversation should be handled by a class of behavior known as Expedited Forwarding (EF). A packet handled this way will be forwarded very quickly (with low latency). Hopefully, the variation in latency (known as jitter) will also be low. As a tradeoff, packets in such a stream may be simply dropped if their aggregate bandwidth exceeds a certain threshold. Also, a SLA covering such packets may be expensive to the buyer because providing this kind of service requires that a router have features that make it expensive to build.

A third example is for traffic that is not covered by any SLA, which is called Best Effort (BE) traffic. This type of traffic is typically found now across the Internet. Best effort packets may be dropped for any reason, and have no particular guarantees about latency or jitter.

Therefore, one of the side effects of using multi-switch architectures is the need to decide which packets go on a switch, because any switch can get to any destination. Many possible algorithms may be implemented to aggregate data across multiple InfiniBand switch sub-networks. Accordingly, there is a need for an algorithm that is simple, fast, fair, and robust.

DETAILED DESCRIPTION

Figure 1:
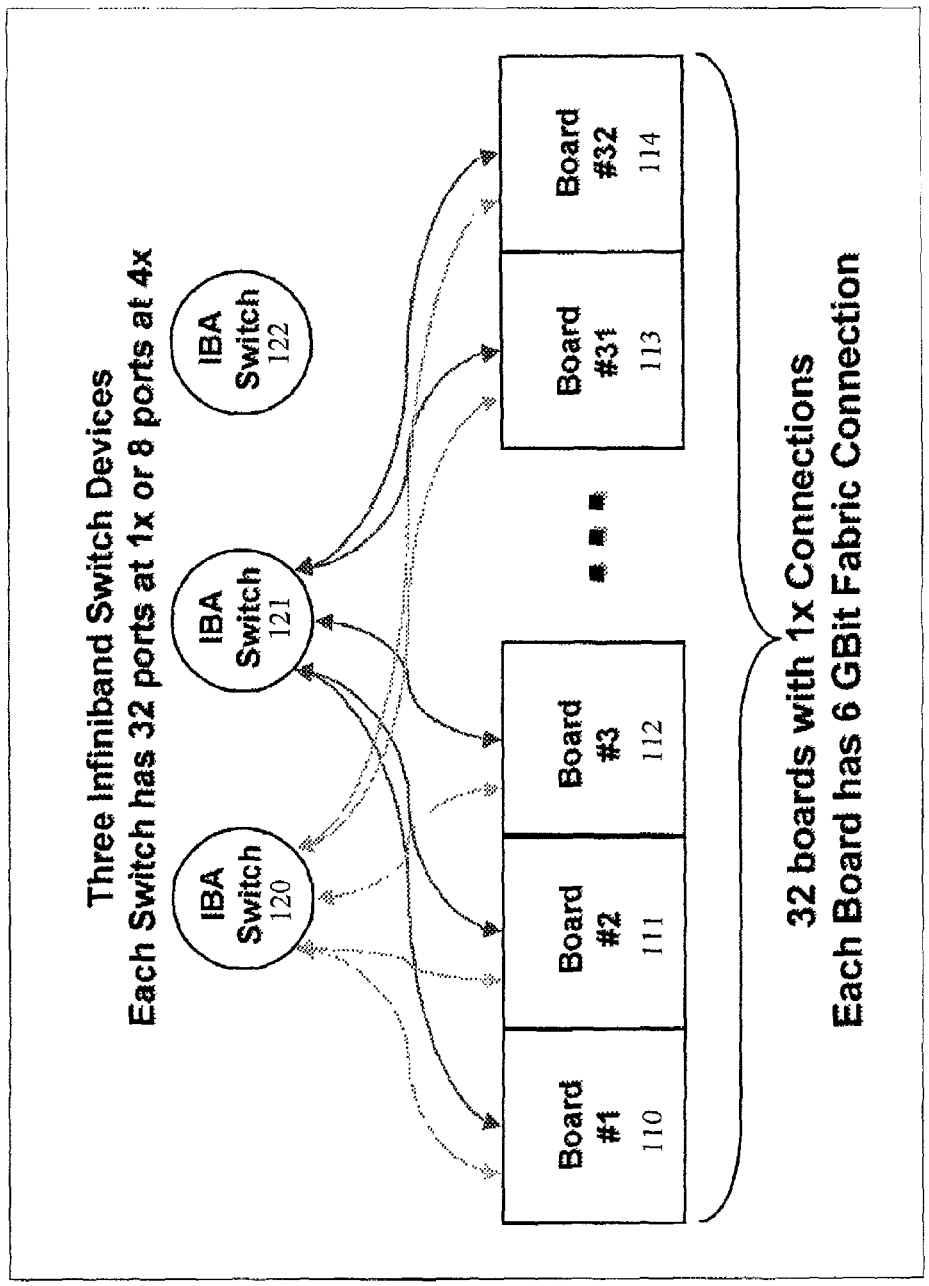
FIG. 1 illustrates an InfiniBand multi-star fabric with up to 32 boards interconnected to three InfiniBand switch devices according to an embodiment of the present invention.
Figure 2:
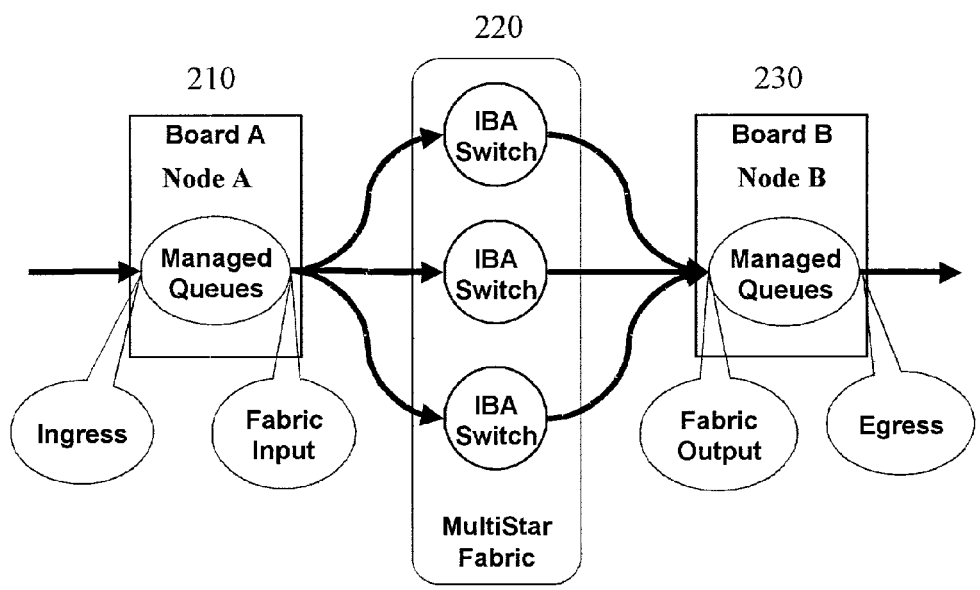
FIG. 2 illustrates an InfiniBand multi-star fabric connected to a source node A/board A and a destination node B/board B according to an embodiment of the present invention.

The present invention exists within the context of connecting multiple entities within a system (generally multiple boards within a system), using multiple InfiniBand switch sub-networks. The number of sub-networks is not important, so long as it is two or more. FIG. 1 illustrates an InfiniBand multi-star switch fabric with up to 32 boards 110, 111, 112, 113, 114 interconnected to three InfiniBand switch devices 120, 121, 122. FIG. 2 illustrates an InfiniBand multi-star switch fabric 220 connected to a source node A/board A 210 and a destination node B/board B 230. A multi-star switch fabric is a set of parallel stars, each star consisting of a single switch which is connected to every node; the switches are not interconnected in any way.

Figure 3:
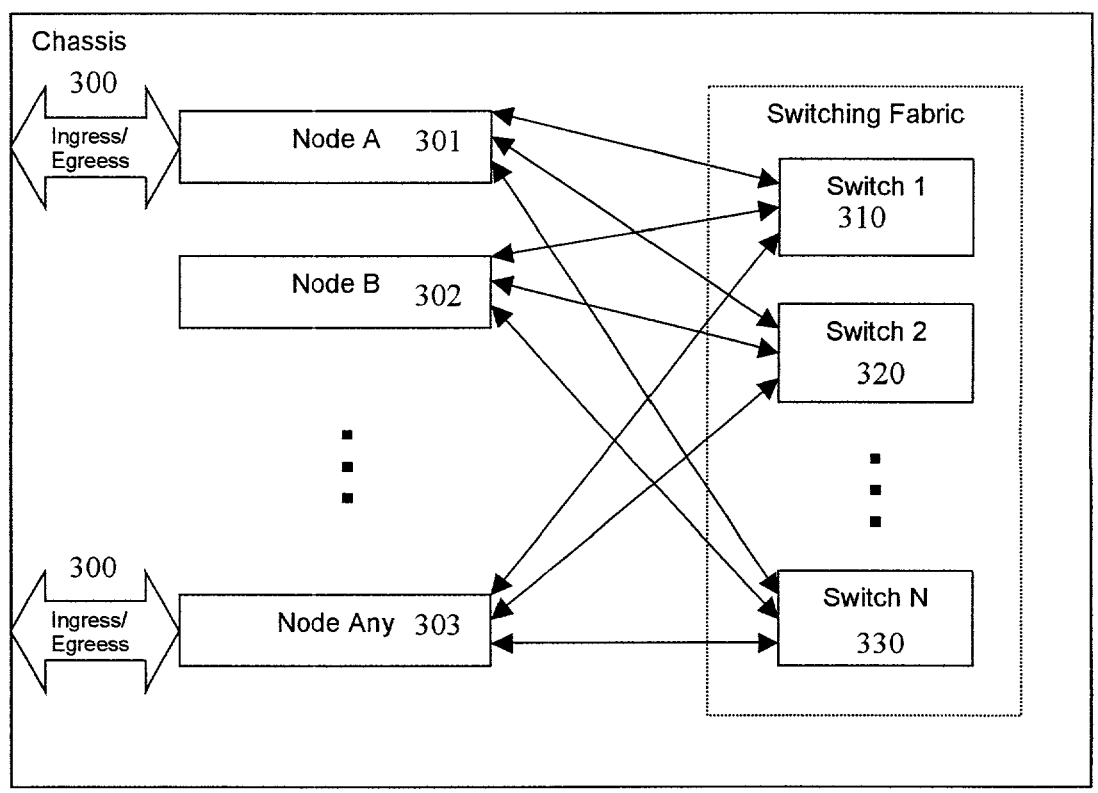
FIG. 3 illustrates multiple nodes connected to multiple switches according to an embodiment of the present invention.

Refering to FIG. 3, the entities (boards or nodes) 301, 302, 303 provide different levels of service for each packet flow through the system. Nodes 301, 302, 303 are composed of one or more electronic processors that together perform the functions of the present invention. Nodes 301, 302, 303 communicate with each other by sending packets through switches 310, 320, 330, via links. Because each node 301, 302, 303 connects to multiple switches 310, 320, 330, each node 301, 302, 303 can send packets to another node 301, 302, 303 via multiple paths (specifically, one or more per switch).

Links are the connections between nodes and switches (or node to node, or switch to switch, in general). They are capable of transmitting no more than a certain amount of information at any one time, known as bandwidth. Bandwidth may be measured, for example, in bits/second. In general, there is no restriction on the number of switches (N) except that it be greater than 1.

A flow is a set of packets that all share a set of characteristics. Typically, the characteristics include the source and destination address of the packet, as well as its protocol type and possibly its priority or classification. It is important that all the packets in a flow maintain a certain sequence in which they were sent, preferably arriving at their destination in that same sequence. If they do arrive out of sequence they can be re-sequenced, or put back in order, however, it requires a lot more work to re-sequence packets at the end. Therefore, a good design attempts to keep all the packets in a flow in sequence all through the network so that they arrive at the far end in sequence and do not require re-sequencing.

For example, if two persons are communicating via Internet Protocol (IP) telephony, there are four flows involved. The data stream from each side to the other, which carries the voice, and a control stream from each side to the other, by which each side tells the other how well the data is coming through. Each of the data streams is composed of a sequence of packets, each one containing only a short snatch of conversation, perhaps only 5 milliseconds long. Thus, there are 200 packets required to carry each single second of the phone conversation. It would be best if the packets were to arrive in the same sequence in which they were sent. If in fact a few packets are switched around, the system will still work, however, it is preferred that they all flow out in the same sequence that they came in.

Managed traffic consists of the set of flows that the system operator seeks to ensure gets through the system within certain bounds. For example, the operator might be paid to make sure that all the traffic from a particular source network to a particular destination network gets through with no loss (no dropped packets), and with bounded latency and jitter (latency is the amount of time it takes for a packet to traverse the system, and jitter is the mean change in latency from packet to packet). Because managed traffic is a revenue source, it is worth building a system that can enforce its requirements.

All other traffic is un-managed traffic (UT). The bulk of Internet traffic is un-managed traffic (UT). Un-managed traffic is often called Best Effort because that is all the effort that is expected on the part of the system. A network should do its best to get the packet through. However, it is acceptable if it is dropped, re-sequenced, or held for several minutes.

The present invention includes how the unmanaged traffic flow is implemented. More specifically, how any node chooses the path that a packet of un-managed traffic (UT) will take to any other node. The node must choose the switches 310, 320, 330 from 1 to N, to which it will send the packet.

Figure 4:
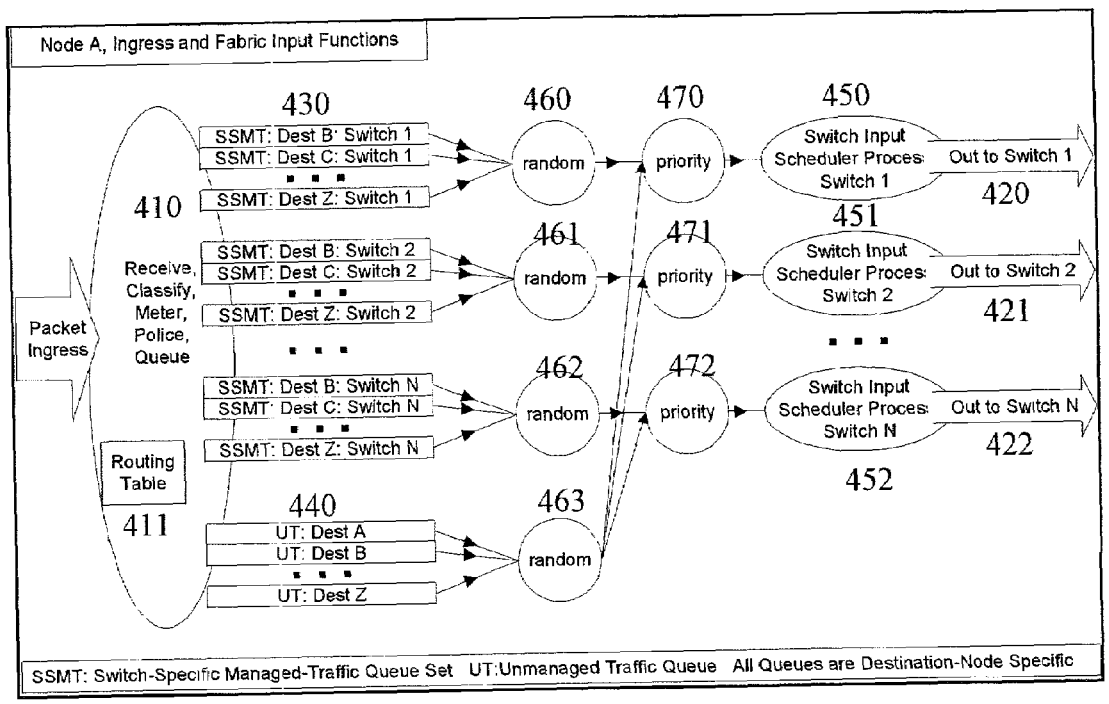
FIG. 4 illustrates processing of packets from ingress to fabric input according to an embodiment of the present invention.

Processing of packets from ingress to fabric input is shown in FIG. 4. Depicted is the flow of packets through a single node going to the switches 420, 421, 422. A single classifier 410 on the node classifies all incoming traffic to a particular flow. The flow defines a set of parameters including the destination node (A-Z), the path by which it will get to the destination node (switches 1-N, 420, 421, 422), and classification (managed or unmanaged). The individual packets end up in queues 430, 440 according to their classification.

There is a separate set of queues 430 for every destination node, per switch, for managed traffic. The set of queues is shown as a single box for simplicity; and is labeled SSMT, for Switch-Specific Managed-Traffic Queues.

Multiple queues are maintained per switch for two reasons. The primary reason is that multiple queues provide a steering function. After classification, the switch has been identified. If the packets were put back into the same queue, the switch information would have to be carried along with the packet. This scheme is in fact done in some implementations. However, separating the packets into separate queues is another way to carry the information.

The second reason is to prevent head-of-line blocking by a switch. This occurrence should be a rare condition (the switches should not back up very often, but it can happen, and separate queues prevent this condition). This head-of-line blocking would occur if there were only a single queue, and if, for example, a packet slated to go through switch 1 310 (see FIG. 3) were in front of a packet slated to go through switch 2 320, and switch 1 310 was heavily loaded but switch 2 320 was not. The packet slated to go to switch 1 310 would be unable to be taken off the queue because switch 1 310 would be unavailable, and it would block the packet slated for switch 2 320, even though the packet slated for switch 2 320 could go if it could get off the queue.

Multiple queues 430 are also maintained per destination node for the same switch in order to allow randomization between the destination flows through each single switch. This arrangement is an optimization discussed below.

All traffic that is not managed is by definition unmanaged, and flows into the queues labeled UT, for Unmanaged Traffic Queues 440, one per destination node.

There is on each node, for each switch, a Switch Input Scheduler Process 450, 451, 452, which takes packets from the node's queues 430 and sends them to a particular switch 420, 421, 422. There is one such process for each switch, on each node. This Switch Input Scheduler Process 450 is the process that handles selecting which queue 430 should be serviced next, for each switch 420, 421, 422.

After all of the managed traffic is successfully carried across the switches, it is desirable to carry as much unmanaged traffic as possible. This scheme provides good use of the hardware and provides an important service, even if the service is not directly paid for.

Because unmanaged traffic will generally fill up all available bandwidth, it is important to reduce its impact on the system under the assumption that it would saturate the system. Unmanaged traffic, by definition, can be dropped if necessary, and can be mis-ordered occasionally as well. Also, it has no latency or jitter bounds.

The requirements for servicing unmanaged traffic are that any unmanaged flows:

1) Do not interfere with any of the managed flows;
2) Fully utilize all bandwidth available above and beyond that required by the managed flows;
3) Do not depend on a priori knowledge of the bandwidth of the unmanaged flows; and
4) Are not usually re-ordered (that is, most unmanaged flows are not re-ordered most of the time, although rare re-ordering is allowed).

When multiple nodes are sending data to the same destination node at the same time, the destination node can become temporarily overloaded. This occurrence can happen particularly when some process happens to create synchronization between the various input nodes sending to the single destination node. Such synchronization may occur in the same way that Transmission Control Protocol (TCP) flows become synchronized through a router if a tail-drop policy is used for policing the input queues rather than a Random Early Drop (RED) policy.

Similarly, multiple nodes might inadvertently send data all to the same switch at one time. Although the average load could be low, the instantaneous load on the switch could be quite high and cause problems.

One way to smooth out such spikes is to introduce a random element into the scheduling of packets. It is preferrable that the random element is unable to inadvertently synchronize across the source nodes, or else it could make the situation worse rather than better.

Assuming that one wishes to perform the randomization to smooth out the traffic, one does so by splitting out the queues so that each destination node has its own separate set of managed queues 430 and its own unmanaged queues 440, as shown in FIG. 4.

A randomizer function 460, 461, 462, 463 is added behind each set of queues 430, 440, which randomly decides which destination node queue 430, 440, is going to be serviced next. In other words, when the switch input scheduler process 450, 451, 452 for a particular switch needs to retrieve a packet, the switch input scheduler process 450, 451, 452, pulls from its priority queue 470, 471, 472, which:

1) Pulls first from the randomizer for the managed queues 460, 461, 462.
   a. If there are packets available in the managed queues 430, the managed queue randomizer 460, 461, 462 pulls from the managed queues 430.
2) If there are no packets available in the managed queues 460, 461, 462, the switch input scheduler process 450, 451, 452 pulls from the randomizer for the unmanaged queues 463. If there are packets available, the randomizer for the unmanaged queues 463 selects one queue randomly from those available and returns that queue's head packet.
3) Else, there are no packets available for that switch yet, and the switch input scheduler process 450, 451, 452 pulls again.

Figure 5:
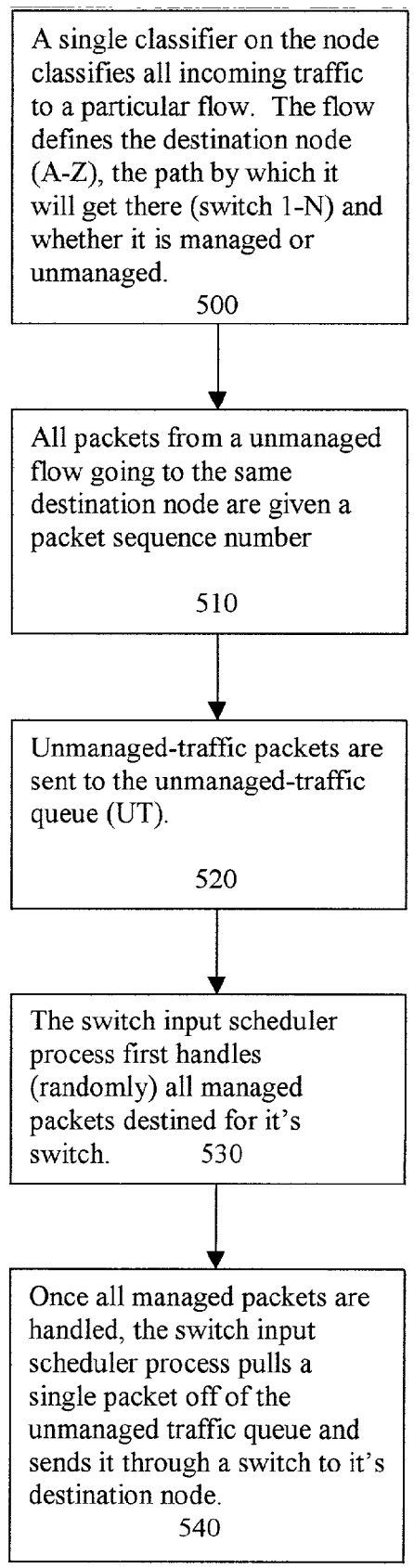
FIG. 5 illustrates a flow chart for ingress an fabric input functions according to an embodiment of the present invention.
Figure 6:
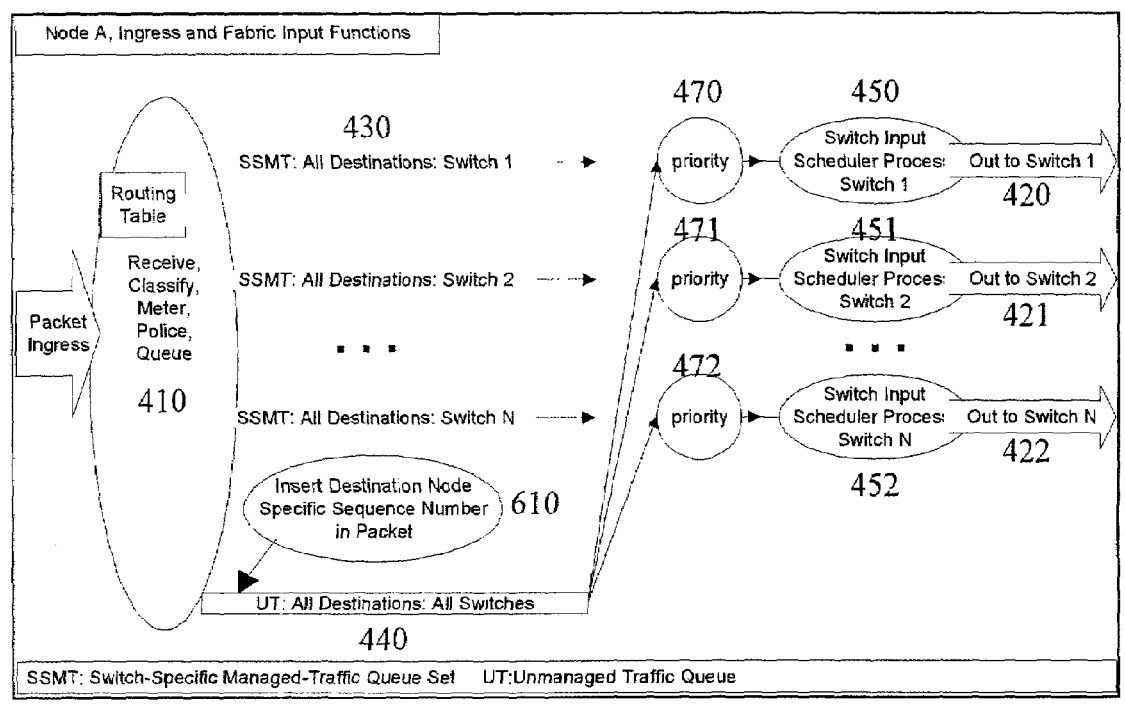
FIG. 6 illustrates unmanaged-traffic functions in source node A according to an embodiment of the present invention.

FIG. 5 illustrates a flow for ingress functions for implementation of a method for inverse multiplexing of unmanaged traffic packets over a multi-star InfiniBand network. FIG. 6 illustrates ingress and unmanaged-traffic functions in a node. A single classifier 410 on the node classifies 500 all incoming traffic to a particular flow. The flow defines the destination node (A-Z), the path by which it will get there (switches 1-N) 420, 421, 422, and whether it is managed or unmanaged. The individual packets are sent to queues 430, 440 according to their classification.

All packets from a unmanaged flow going to the same destination node are given 510 a packet sequence number 610. The packet sequence number 610 is placed in the packet wherever it fits; for example, it might be placed in pre-existing headers in the packet; or if necessary, a shim is added to the packet to carry the sequence number through the switch.

The unmanaged-traffic packets are sent 520 by the classifier 410 to a unmanaged-traffic queue (UT) 440. The switch input scheduler process 450 first handles 530 all managed packets destined for its switch (this is the function of the priority block 470, 471, 472 shown). Once all managed packets are handled, the switch input scheduler process 450, 451, 452, pulls a single packet off of the unmanaged traffic queue 440 and sends 540 it through a switch to it's destination node. A randomizer function 460, 461, 462, 463 (se FIG. 4) is added behind each set of queues 430, 440 which randomly decides which destination node queue 430, 440, is going to be serviced next.

Figure 7:
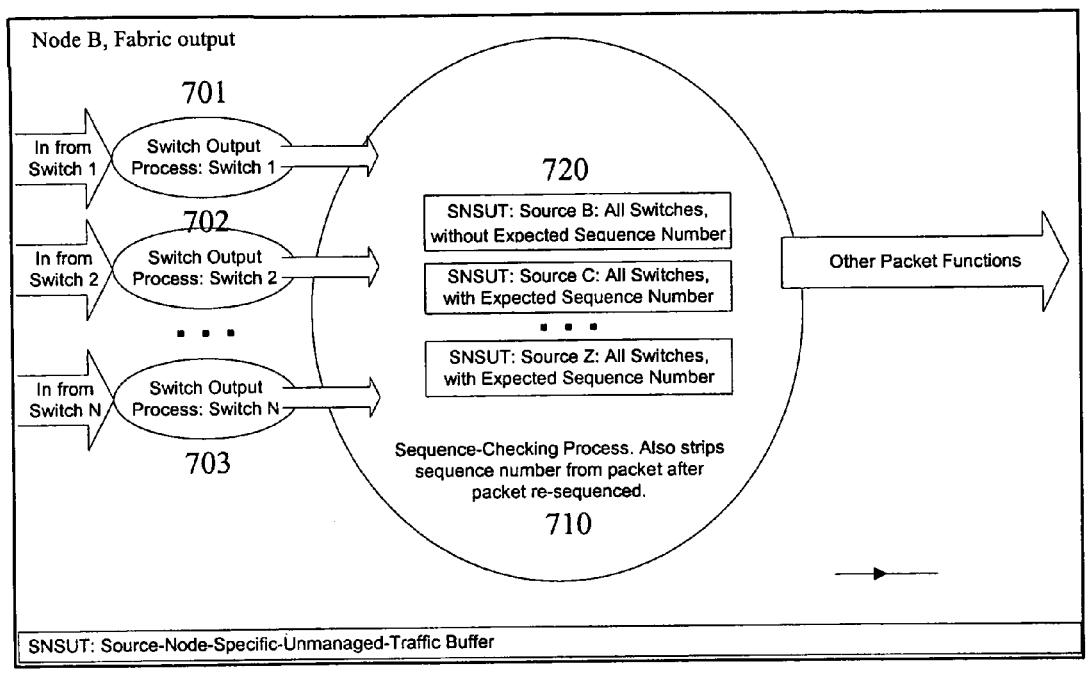
FIG. 7 illustrates packets transmitted from source node A, through a switch fabric to a fabric output are acted upon by the source node specific Sequence-Checking Process at destination node B according to an embodiment of the present invention.

FIG. 7 illustrates unmanaged-traffic functions in a destination node. At the destination node, arriving packets in a flow may be mis-ordered by having traveled in parallel through different switches. If so, the condition must be detected and fixed. Typically, the mis-ordering will be minimal, on the order of 1 packet out of sequence; but there could be situations where on the order of N (the number of switches) packets are out of sequence. The present invention re-sequences the packets with fairly low overhead.

Figure 8:
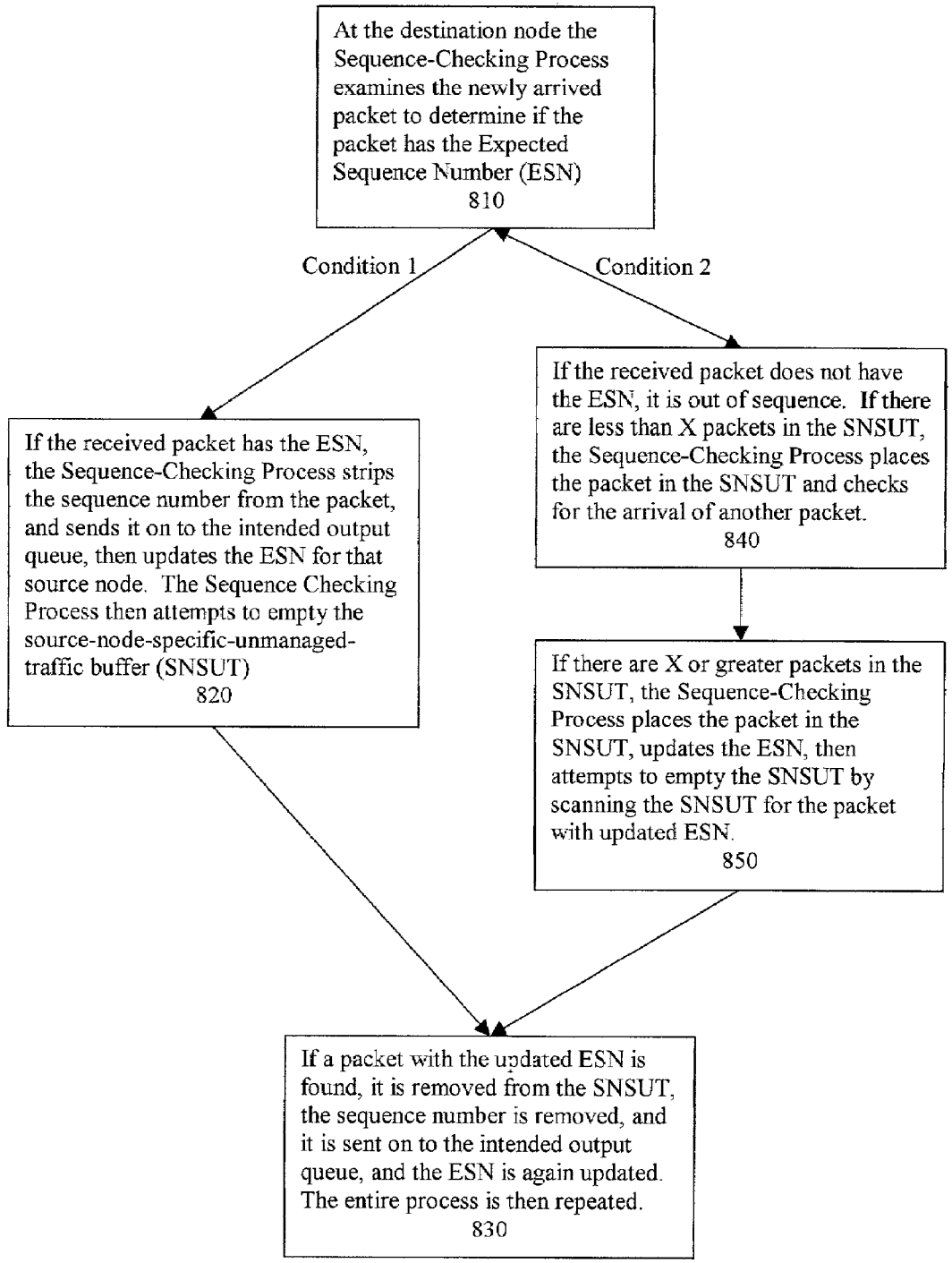
FIG. 8 illustrates a flow chart for the source specific sequence-checking process according to an embodiment of the present invention.

FIG. 8 illustrates a flow chart for egress functions for implementation of a method for inverse multiplexing of unmanaged traffic packets over a multi-star InfiniBand network according to an embodiment of the present invention. At the destination node B, see FIG. 7, packets transmitted from the source node A, through the switch fabric to the fabric output, are acted upon by the source node specific Sequence-Checking Process 710. The source node specific Sequence-Checking Process 710 examines the newly arrived packet to determine 810 if the packet has the Expected Sequence Number (ESN). ESNs are kept by a source node, and are modulo some number greater than two times × (2X), which is the maximum number of packets that may be buffered in the source-node-specific-unmanaged-traffic buffer (SNSUT) 720. There is a SNSUT 720 assigned for each source node to buffer arriving unmanaged packet with the ESN. Arriving unmanaged packets without the ESN buffered in the SNSUT 720 are then referred to as placed unmanaged packets without the ESN.

If the arriving unmanaged packet has the ESN, the source node specific Sequence-Checking Process 710 strips the packet sequence number 610 from the packet, and sends it on to the intended output queue, then updates the ESN for that source node. The source node specific Sequence Checking Process 710 then attempts to empty 820 the SNSUT 720 by scanning it for the placed unmanaged packet with the Oust updated) ESN (placed unmanaged packet with the ESN).

If a placed unmanaged packet with the updated ESN is found, it is removed from the buffer 720, the packet sequence number 710 is stripped, and it is sent on to the intended output queue, and the ESN is again updated. The entire sequence is then repeated. Eventually, either the buffer 720 is emptied or no placed unmanaged packet with the ESN is found, so the process returns to wait 830 for a arriving unmanaged packet with the ESN.

If the arriving unmanaged packet does not have the ESN, it is out of sequence 840. If there are less than X packets in the source-node-specific-unmanaged-traffic buffer 720, the sequence-checking process 710 places the arriving unmanaged packet without the ESN in the source-node-specific-unmanaged-traffic buffer 720 to form a placed unmanaged packet without the ESN, and checks 840 for the arrival of a arriving unmanaged packet with the ESN (see FIG. 8). (X is expected to be small, e.g. 1 to 3, or on the order of the number of switches, N.)

If there are X or greater packets in the source-node-specific-unmanaged-traffic buffer 720, 850, the sequence-checking process 710 places the arriving unmanaged packet without the ESN in the source-node-specific-unmanaged-traffic buffer (SNSUT) 720 to form a placed unmanaged packet without the ESN, updates the expected sequence number (ESN), then attempts to empty the source-node-specific-unmanaged-traffic buffer (SNSUT) 720 by scanning 850 the buffer for a placed unmanaged packet with the ESN.

The way that the sequence-checking process 710 attempts to empty the SNSUT is: If a placed unmanaged packet with the ESN is found, it is removed from the buffer 720, the packet sequence number 610 is stripped, and it is sent on to the intended output queue, and the expected sequence number (ESN) is again updated. The entire sequence is then repeated until either the buffer is empty or no placed unmanaged packet with the ESN is found 850.

A switch output process 701, 702, 703 sorts arriving managed packets received from the fabric output, and sends arriving managed packets to an intended output queue. (See FIG. 7.)

The invention utilizes available bandwidth by multiplexing managed and unmanaged traffic flows across a multi-star Infiniband switch network. To provide Quality of Service the network traffic is differentiated. The use of a switch fabric provides multiple levels of redundancy. A randomization function is used to smooth out the differentiated traffic flow. Unmanaged traffic flow may be re-sequenced if necessary with fairly low overhead.

While the description above refers to particular embodiments of the present invention, it will be understood that many modifications may be made without departing from the spirit thereof The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A method of inverse multiplexing unmanaged traffic flows over a multi-star switch network, comprising:
    classifying incoming traffic to a flow;
    assigning a packet sequence number to a packet from a unmanaged traffic flow going to a destination node, placing the packet into an unmanaged traffic queue, and maintaining an expected sequence number (ESN);
    processing and transmitting all managed packets destined for a switch, then processing and transmitting an unmanaged packet from the unmanaged traffic queue;
    placing an arriving unmanaged packet without the ESN from a switch fabric output into a destination source-node-specific-unmanaged-traffic buffer (SNSUT) to form a placed unmanaged packet without the ESN; and
    moving an arriving unmanaged packet having the ESN, an arriving managed packet received from the switch fabric output, or a placed unmanaged packet having the ESN in the SNSUT, to an intended output queue, wherein the placing and moving are carried out by a source-node-specific-sequence-checking-process (SNSSCP).

2. The method according to claim 1, wherein the flow defines a source node, a destination node, a switch, and whether the flow is managed or unmanaged.

3. The method according to claim 1, wherein a source node classifier, using a traffic engineering algorithm, classifies the incoming traffic to the flow, assigns the packet sequence number to the packet from the unmanaged traffic flow going to the destination node, and places the packet into the unmanaged traffic queue.

4. The method according to claim 1, wherein the processing and transmitting of packets destined for the switch is carried out by a switch input scheduler process.

5. The method according to claim 4, wherein the switch input scheduler process includes a randomization process.

6. The method according to claim 1, wherein one destination source-node-specific-unmanaged-traffic buffer (SNSUT) is assigned per source node.

7. The method according to claim 1, wherein the arriving unmanaged packet having the ESN is in sequence, the SNSSCP strips the packet sequence number from the arriving unmanaged packet having the ESN to form a stripped unmanaged packet, sends the stripped unmanaged packet to the intended output queue, updates the ESN for a source node, the SNSSCP attempts to empty the SNSUT by scanning the SNSUT for the placed unmanaged packet having the ESN, if the placed unmanaged packet having the ESN is found, the placed unmanaged packet having the ESN is removed from the SNSUT, the packet sequence number is stripped from the placed unmanaged packet having the ESN to form the stripped unmanaged packet, the stripped unmanaged packet is sent to the intended output queue, and the ESN for the source node is updated.

8. The method according to claim 7 wherein the arriving unmanaged packet without the ESN is out of sequence, if there are less than X placed unmanaged packets without the ESN in the SNSUT, the SNSSCP places the arriving unmanaged packet without the ESN in the SNSUT to form a placed unmanaged packet without the ESN and checks the switch fabric output for the arriving unmanaged packet having the ESN, X being equal to the number of switches.

9. The method according to claim 8 wherein the arriving unmanaged packet without the ESN is out of sequence, if there are X or greater placed unmanaged packets without the ESN in the SNSUT, the SNSSCP places the arriving unmanaged packet without the ESN in the SNSUT to form a placed unmanaged packet without the ESN, updates the ESN for the source node, and attempts to empty the SNSUT by scanning the SNSUT for the placed unmanaged packet with the ESN.

10. A program code storage device, comprising:
a machine-readable storage medium; and
machine-readable program code, stored on the machine-readable storage medium, having instruction to
classify incoming traffic to a flow,
assign a packet sequence number to a packet from an unmanaged traffic flow going to a destination node, place the packet into an unmanaged traffic queue, and maintain an expected sequence number (ESN),
process and transmit all managed packets destined for a switch first, then process and transmit an unmanaged packet from the unmanaged traffic queue,
place an arriving unmanaged packet without the ESN from a switch fabric output into a destination source-node-specific-unmanaged-traffic buffer (SNSUT), to form a placed unmanaged packet without the ESN; and
move an arriving unmanaged packet having the ESN or an arriving managed packet, received from the switch fabric output, or a placed unmanaged packet having the ESN in the SNSUT, to an intended output queue, wherein the placing and moving are carried out by a source-node-specific-sequence-checking-process (SNSSCP).

11. The program code storage device according to claim 10 wherein the flow defines a source node, a destination node, a switch, and whether the flow is managed or unmanaged.

12. The program code storage device according to claim 10, wherein a source node classifier, using a traffic engineering algorithm, classifies incoming traffic to the flow, assigns the packet sequence number to the packet from the unmanaged traffic flow going to the destination node, and places the packet into the unmanaged traffic queue.

13. The program code storage device according to claim 10 wherein the processing and transmitting of packets destined for the switch is carried out by a switch input scheduler process.

14. The program code storage device according to claim 13 wherein the switch input scheduler process includes a randomization process.

15. The program code storage device according to claim 10 wherein a switch input scheduler process includes a randomization process.

16. The program code storage device according to claim 10 wherein one destination source-node-specific-unmanaged-traffic buffer (SNSUT) is assigned per source node.

17. The program code storage device according to claim 10 wherein the arriving unmanaged packet having the ESN is in sequence, the SNSSCP strips the packet sequence number from the arriving unmanaged packet having the ESN to form a stripped unmanaged packet, sends the stripped unmanaged packet to the intended output queue, updates the ESN for a source node, the SNSSCP attempts to empty the SNSUT by scanning the SNSUT for the placed unmanaged packet having the ESN, if the placed unmanaged packet having the ESN is found, the placed unmanaged packet having the ESN is removed from the SNSUT, the packet sequence number is stripped from the placed unmanaged packet having the ESN to form the stripped unmanaged packet, the stripped unmanaged packet is sent to the intended output queue, and the ESN for the source node is updated.

18. The program code storage device according to claim 17 wherein the arriving unmanaged packet without the ESN is out of sequence, if there are less than X placed unmanaged packets without the ESN in the SNSUT buffer, the SNSSCP places the arriving unmanaged packet without the ESN in the SNSUT to form a placed unmanaged packet without the ESN and checks the switch fabric output for the arriving unmanaged packet having the ESN, X being equal to the number of switches.

19. The program code storage device according to claim 18 wherein the arriving unmanaged packet without the ESN is out of sequence, if there are X or greater placed unmanaged packets without the ESN in the SNSUT, the SNSSCP places the arriving unmanaged packet without the ESN in the SNSUT to form a placed unmanaged packet with out the ESN, updates the ESN for the source node, and attempts to empty the SNSUT by scanning the SNSUT for the placed unmanaged packet with the ESN.

20. A multi-star switch network, comprising:
a multi-star switch fabric; and
an input device, connected to the multi-star switch fabric, having a plurality of Switch-Specific Managed-Traffic Queues (SSMT), an unmanaged traffic queue, and a switch input scheduler, wherein the input device classifies incoming traffic to a flow to form classified flows, assigns a packet sequence number, maintains an expected sequence number (ESN), places packets from the classified flows into the SSMT and the unmanaged traffic queue, selects such that the switch input scheduler for a switch selects all packets available from the SSMT, then selects a single packet from the unmanaged traffic queue to form selected packets, transmits the selected packets from the classified flows from the input device through the multi-star switch fabric to an output device, and the output device, connected to the multi-star switch fabric, containing a switch output process that sorts arriving packets received from a switch fabric output, and sends the arriving packets to an intended output queue.

21. The multi-star switch network according to claim 20, wherein the flow defines a source node, a destination node, the switch, and whether the flow is managed or unmanaged.

22. The multi-star switch network according to claim 21 wherein the switch input scheduler selects and moves selected packets from the SSMT and the unmanaged traffic queue to the switch.

23. The multi-star switch network according to claim 20, wherein the input device classifies, using a traffic engineering algorithm, the incoming traffic based on the flow, and places the packets from the classified flows into the SSMT and the unmanaged traffic queue.

24. The multi-star switch network according to claim 20 wherein the switch input scheduler selects by using a randomization function.

25. The multi-star switch network according to claim 20 wherein the input device has a switch input scheduler process for the switch.

26. The multi-star switch network according to claim 20 wherein the arriving packets received from the switch fabric output includes at least one of an arriving unmanaged packet having the ESN, an arriving unmanaged packet without the ESN, and an arriving managed packet.

27. The multi-star switch network according to claim 26 wherein the switch output process places the arriving packets from the switch fabric output without the ESN into a destination source-node-specific-unmanaged-traffic buffer (SNSUT), and moves the arriving packets with the ESN received from the switch fabric output and a placed packet in the SNSUT with the ESN to the intended output queue.

* * * * *